United States Patent [19]

McCarthy et al.

[11] Patent Number: 5,029,070
[45] Date of Patent: Jul. 2, 1991

[54] COHERENT CACHE STRUCTURES AND METHODS

[75] Inventors: Daniel M. McCarthy; Joseph C. Circello; Gabriel R. Munguia, all of Phoenix; Nicholas J. Richardson, Scottsdale, all of Ariz.

[73] Assignee: Edge Computer Corporation, Scottsdale, Ariz.

[21] Appl. No.: 236,449

[22] Filed: Aug. 25, 1988

[51] Int. Cl.⁵ .................... G06F 12/08; G06F 15/16
[52] U.S. Cl. .................... 364/200; 364/243.4; 364/243.41; 364/243; 364/228.1; 364/228.3
[58] Field of Search ... 364/200 MS File, 900 MS File

[56] References Cited

U.S. PATENT DOCUMENTS

| | | | |
|---|---|---|---|
| 3,723,976 | 3/1973 | Alvarez et al. | 364/200 |
| 3,771,137 | 11/1973 | Barner et al. | 364/200 |
| 4,141,067 | 2/1979 | McLagan | 364/200 |
| 4,392,200 | 7/1983 | Arulpragasam et al. | 364/200 |
| 4,394,731 | 7/1983 | Flusche et al. | 364/200 |
| 4,410,944 | 10/1983 | Kronies | 364/200 |
| 4,410,946 | 10/1983 | Spencer | 364/200 |
| 4,442,487 | 4/1984 | Fletcher et al. | 364/200 |
| 4,445,174 | 4/1984 | Fletcher | 364/200 |
| 4,458,310 | 7/1984 | Chang | 364/200 |
| 4,502,110 | 2/1985 | Saito | 364/200 |
| 4,607,331 | 8/1986 | Goodrich, Jr. et al. | 364/200 |
| 4,622,631 | 11/1986 | Frank et al. | 364/200 |
| 4,631,660 | 12/1986 | Woffinden et al. | 364/200 |
| 4,695,943 | 9/1987 | Keeley et al. | 364/200 |
| 4,785,395 | 11/1988 | Keeley | 364/200 |
| 4,833,601 | 5/1989 | Barlow et al. | 364/200 |
| 4,928,225 | 5/1990 | McCarthy et al. | 364/200 |

OTHER PUBLICATIONS

Encyclopedia of Computer Science and Engineering, second Edition, 1982, pp. 1409-1413.
"Cache Coherence Protocols: Evaluation Using a Multiprocessor Simulation Model", by J. Archibald, and J. Baer, ACM Transactions on Computer Systems, vol. 4, No. 4, Nov. 1986, pp. 273-298.
"An Economical Solution to the Cache Coherence Problem", by J. Archibald and J. Baer, IEEE, 1984, pp. 355-362.
"Analysis of Multiprocessor Cache Organizations with Alternative Main Memory Update Policies", by W. Yen and K. Fu, IEEE, 1981, pp. 89-101.
"Coherence Problem in a Multicache System", by W. Yen and K. Fu, IEEE, 1982, pp. 332-339.

(List continued on next page.)

Primary Examiner—Allen R. MacDonald
Assistant Examiner—Gopal C. Ray
Attorney, Agent, or Firm—Cahill, Sutton & Thomas

[57] ABSTRACT

A multiprocessing system includes a cache coherency technique that ensures that every access to a line of data is the most up-to-date copy of that line without storing cache coherency status bits in a global memory and any reference thereto. An operand cache includes a first directory which directly, on a one-to-one basis, maps a range of physical address bits into a first section of the operand cache storage. An associative directory multiply maps physical addresses outside of the range into a second section of the operand cache storage section. All stack frames of user programs to be executed on a time-shared basis are stored in the first section, so cache misses due to stack operations are avoided. An instruction cache having various categories of instructions stores a group of status bits identifying the instruction category with each instruction. When a context switch occurs, only instructions of the category least likely to be used in the near future are cleared decreasing delays due to clearing of the instruction cache as a result of context switches. A page-mapped I/O cache structure interfaces by a large number of I/O channels which regard a single I/O cache as an exclusive buffer. System operating delays due to maintaining cache coherency, operand cache misses, instruction cache misses, I/O cache misses, and maintaining a cache coherency are substantially reduced.

18 Claims, 5 Drawing Sheets

OTHER PUBLICATIONS

"A Cache-Based Multiprocessor with High Efficiency", by Michel Dubois, IEEE Transactions on Computers, vol. C-34, No. 10, Oct. 1985, pp. 968-972.

"Effects of Cache Coherency in Multiprocessors", by M. Dubois, and F. Briggs, IEEE, 1982, pp. 299-308.

"Effects of Cache Coherency in Multiprocessors", by M. Dubois and F. Briggs, IEEE Transactions on Computers, Vol. C-31, No. 11, Nov. 1982, pp. 1083-1099.

"The Synapse N+1 System: Architectural Characteristics and Performance Data of a Tightly-Coupled Multiprocessor System", by E. Nestle and A. Inselberg, Synapse Computer Corporation, pp. 233-239, IEEE, 1985.

"Using Cache Memory to Reduce Processor-Memory Traffic", by James Goodman, ACM, 1983, pp. 124-131.

"A New Solution to Coherence Problems in Multicache Systems", by L. Censier, and P. Feautrier, IEEE Transactions on Computers, vol. C-27, No. 12, Dec. 1978, pp. 1112-1118.

COHERENT CACHE STRUCTURES AND METHODS

BACKGROUND OF THE INVENTION

The invention relates to an arrangement of coherent cache structures and techniques in a multiprocessor system that results in high cache hit ratios and high bus bandwidth.

Many manufacturers of computer-based products need to supply a range of related products or upgrade the size and performance of the earliest products in a series to remain competitive in the market. It is highly desirable that the development costs of upgraded products be minimized. To this end, it is highly desirable to be able to use the same software developed for the earlier products in the upgraded products, since software development usually is a major part of the development cost of the new computer-based product. Many computer-based products use the Motorola 68000 family of microprocessors, which execute a CISC (Complex Instruction Set Computer) instruction set. Upgrading performance, speed, and size of a product based on the Motorola 68000 microprocessors can be approached in several ways. One approach involves use of "scaleable" microprocessing techniques in which additional microprocessors are connected to the main bus to help share in the data processing workload. However, adding additional microprocessors results in rapidly increasing amounts of bus contention as the number of processors connected to the bus increases. Bus bandwidth therefore rapidly becomes the limiting factor in system performance as the number of microprocessors is increased. Various ways of reducing "bus traffic" have been proposed and/or used. One way to reduce bus traffic is to increase the so-called "cache hit ratio" by increasing the sizes of various cache memories. Another way is to use various improved cache coherency schemes that reduce bus traffic and especially minimize the number of accesses to the slow main memory. Another approach to increasing computer system performance has been to design systems which execute so-called RISC (Reduced Instruction Set Computer) instruction sets rather than CISC instruction sets. In RISC instruction sets all instructions have a single fixed length, and all use a so-called store-load architecture in which read and write operations from or to memory must only be accomplished with certain read and write instructions, whereas in CISC instruction sets it may be possible to include complex instructions that automatically effectuate read and write memory accesses. Although RISC instruction sets at the present state of the art can be executed with Average Instruction Times (AITs) of only about 1.5 machine cycles per instruction, the "inflexibility" of RISC instruction sets often means that a much larger number of instructions must be included in a program to accomplish a particular task. Furthermore, a system that uses a RISC instruction set is likely to substantially increase bus traffic, due to the much larger number of instructions required. This must be compensated in various ways, for example, by increasing the size, and hence the cost of the instruction cache. In contrast, CISC instruction sets typically can be executed with an AIT of 10-15 machine cycles, but the number of CISC instructions required to accomplish a particular task may be much less than if RISC instructions are used. While each approach offers distinct advantages, at the present time it is unclear which approach will ultimately prevail. However, it is clear that it would be highly desirable if the AIT of CISC instruction sets could be substantially reduced.

In so-called "tightly coupled" multiprocessor systems which are designed to decrease bus contention problems by decreasing bus traffic, it is necessary to ensure "cache coherency". That is, it is necessary to ensure that any processor access to any address always results in access to the most up-to-date copy of the line of data corresponding to that address. The state of the art is generally indicated in U.S. Pat. No. 4,622,631 "Data Processing System Having a Data Coherence Solution", "Cache Coherence Protocols: Evaluation Using a Multiprocessor Simulation Model" by James Archibald and Jean-Loup Baer, ACM Transactions on Computer Systems, Volume 4, No. 4, November 1986, pages 273-298, "A New Solution to Coherence Problems in Multicache Systems", by Lucien M. Censier and Paul Feautrier, IEEE Transactions on Computers, Volume C-27, No. 12, December 1978, pages 1112-1118, "Effects of Cache Coherency in Multiprocessors" by Michael DuBois and Faye A. Briggs, IEEE Transactions on Computers, Volume C-31, No. 11, November 1982, pages 1083-1099, "Data Coherence Problems in a Multicache System" by Ywei C. Yen, David W. Lyen, and King-Sun Foo, IEEE Transactions on Computers, Volume C-34, No. 1, January 1985, pages 56-65, and "Using Cache Memory to Reduce Processor-Memory Traffic", by James R. Goodman, Association for Computing Machinery, 10th Annual Symposium on Computer Architecture, June, 1983.

In U.S. Pat. No. 4,622,631 a "floating ownership" scheme is described under which the ownership of a line of data is passed along between processors and the Global Memory according to a set of rules. The Global Memory "owns" the line of data until it is written into. Then ownership passes to the writing processor. The owner processor is the only one allowed to modify the line of data, and is responsible for furnishing the latest copy of a line of data to all other requesters. The system disclosed in U.S. Pat. No. 4,622,631 requires that a status bit be stored in the Global Memory for each line of data in the Global Memory. That disclosed system requires access to the slow Global Memory and to the status bit of the addressed line of data therein to enable the system to determine whether the present line of data in the Global Memory is to be read or written into. The system disclosed in U.S. Pat. No. 4,622,631 also requires that "bus cycles" be utilized before a processor modifies a line of valid data in its associated cache in order to ensure that any other copy of the present line of data in any other cache is destroyed before it is modified in the cache being accessed. It would be very desirable to avoid the delays caused by the need to access stored status bits in the Global Memory to preserve cache coherency and to avoid the delays caused by the need to use bus cycles to ensure all other copies of the present line of data are destroyed before that line of data in the cache accessed by the requesting processor is modified.

In prior "virtual" instruction caches, every time there is a "context switch" of CPU operation from one user to another it is necessary to clear the entire instruction cache and load the instructions of the new program into the instruction cache. Such clearing and reloading is very time-consuming and causes considerable degradation of overall system performance in a time-sharing system in which there is a large number of such context switches. It would be desirable to find a cost effective way of reducing the number of cache misses caused by context switches in a virtual machine.

In a virtual machine, if a large percentage of operand accesses are stack accesses, there can be a large number of operand cache misses that occur when the accessed line is not present in the operand cache because it is being loaded from the slow Global Memory into the operand cache. Up to now, the expedient of simply increasing the size of the operand cache so that it can hold all of the instructions and data needed by the CPU for a long period of time has been unacceptably costly. It would be highly desirable to find an efficient, cost-effective way of significantly reducing the number of operand cache misses caused by stack accesses.

In a virtual computer the I/O controller uses I/O caches which need to conform to the overall cache coherency protocol of the virtual computer. I/O controllers and I/O caches need to interface with both slow, sequential multiple data streams from various I/O channels and with a high speed parallel system bus. In prior systems, a large number of I/O cache misses may occur, and each such I/O cache misses result in substantial degradation of system performance. It would be highly desirable to find a cost-effective technique for greatly reducing the number of I/O cache misses in a virtual system having a large number of I/O channels.

SUMMARY OF THE INVENTION

Accordingly, it is an object of the invention to provide an improved cache coherency system in a computer.

It is another object of the invention to avoid the need to refer to status bits in a global memory in order to effectuate a cache coherency protocol in a computer system.

It is an object of the invention to provide a system which avoids operand cache misses due to stack operations.

It is another object of the invention to substantially increase the size of an operand cache without unacceptably increasing the cost thereof.

It is another object of the invention to provide an instruction cache technique which avoids the need to clear the entire instruction cache every time there is a context switch.

Briefly described, and in accordance with one embodiment thereof, the invention provides a cache coherency system in which a plurality of cache coherency status bits are stored with each addressable line of data in all caches in the system, but not in the global memory. A plurality of state lines are wire ORed to bus master logic and bus monitor logic in each cache so that the logical union of all of the states of all same type cache coherency bits in every cache except the one undergoing a cache miss appears on the state lines, enabling the bus master to rapidly determine if any other cache has a copy of the line of data causing the cache miss. The bus master also can rapidly determine from the state lines if any other copy of the line of data in another cache has been modified. This all is accomplished without any accesses to the slow global memory. The processor and cache having an exclusive unmodified copy of the currently addressed line of data can modify it without accessing the bus because the coherency protocol guarantees that when a valid, exclusive copy of the line is present in a cache and a status bit indicates the line has not been modified, no other cache can contain that line of data.

In one embodiment of the invention, an operand cache includes a directory section, a high speed storage section, a translation cache, and a virtual bus connected to the processor. The directory section includes a first directory for directly mapping, on a one-to-one basis, a first range of addresses on a physical address bus into a first section of the storage section. An associative directory is provided for multiply mapping addresses on the physical address bus which are outside of the first range into a second portion of the operand cache storage section. The associative directory stores multiple sets of cache coherency status bits and physical address tags. An associative cache hit is produced by comparators that compare the physical address bus with the physical address tags. The first directory contains no physical address tags, and maps physical address bits directly into the first section of the storage section, which is sufficiently large to store most or all stack frames needed for execution of most or all user programs on a time-shared basis within the capability of the computer sYstem (which has a stack-based architecture). Operand cache misses due to stack operations thereby are avoided. This is accomplished because all stack frames are loaded in the first section of the operand cache storage section before executing any user programs and the stack frames are never transferred back and forth between the operand cache and global memory as a result of context switches.

In one embodiment of the invention, an instruction cache storing various categories of instructions also stores a group of status bits identifying the instruction category with each instruction. When a context switch occurs, only instructions of the category least likely to be used in the near future are cleared. Such instructions are cleared by resetting their respective category identifying status bits. Delays due to clearing the instruction cache between context switches are reduced.

DETAILED DESCRIPTION OF THE PREFERRED EMBODIMENTS OF THE INVENTION

The cache techniques described herein are implemented in a system which also includes the pipelining techniques described in the commonly assigned patent application "PIPELINE STRUCTURES AND METHODS" by Joseph C. Circello, Richard H. Duerden, Roger W. Luce, and Ralph H. Olson, filed on even date herewith and incorporated herein by reference, in order to achieve a multiprocessor system capable of executing CISC instruction sets with average instruction times of only about 1.5 clock cycles per instruction.

CACHE MEMORY COHERENCY SYSTEM

Figure 1:
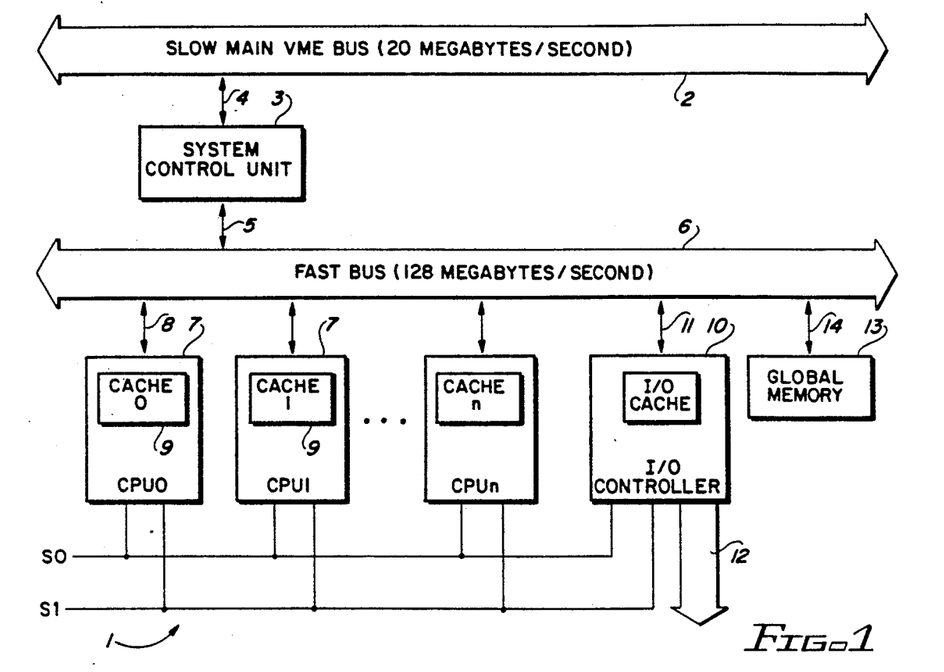
FIG. 1 is a block diagram useful in describing the cache coherency system of the present invention.

In FIG. 1, numeral 2 designates a standard VMEbus, which is widely used on back planes in the computer industry. It operates at 20 megabytes per second. A system control unit (SCU) 3 is connected by bidirectional bus 4 to VMEbus 2 and by bidirectional bus 5 to a much faster bus 6, which operates at 128 megabytes per second. A number of fast central processor units (CPUs) such as 7, each having a "local" high speed cache memory such as 9, are connected by bidirectional bus 8 to high speed bus 6. In FIG. 1, there are n CPUs with their associated cache memories. An input-output controller 10 includes an I/O cache memory, and is connected by bidirectional bus 11 to high speed bus 6. I/O controller 10 also is coupled to a secondary bus by conductors 12. A very large Global Memory 13 is connected by bidirectional bus 14 to high speed bus 6.

In accordance with the present invention, FIG. 1 two status lines S0 and S1, which can have the states indicated in the following table. S0 and S1 are respectively wire ORed to each of the n CPUs and to I/O controller 10. Every line of data in a cache has three coherency bits V, E, and W stored in the cache. "V" represents "Valid", "W" represents "Written", and "E" represents "Exclusive". If V is equal to a "1", it means that the addressed cache location contains the most up-to-date copy of the line of data for the address contained in that location of the cache. If V is equal to a "0", it means that location of the cache is empty. If E is equal to a "1", it means that location contains the only copy of the line of data other than the one in the global memory. If E is equal to "0", at least one other copy of the line of data may be present in another cache. If W is equal to a "1", it means the line of data in the present cache has previously been modified by the present processor. In this case, it is implicit that E is equal to "1". If W is equal to "0", the line of data in the cache has not been modified while in the cache.

The purpose of architectures such as the one in FIG. 1 is to achieve high speed data processing throughput rates that take advantage of the very high speeds that can now be achieved for state-of-the-art CPUs such as 7. It should be noted that Global Memory 13 is very slow compared to the cache memories such as 9. The cache memories 9 can operate at the same speeds as the CPUs 7. In recent years, cache memories have been utilized to contain a large enough portion of the "memory image", i.e., the total stored contents of Global Memory 13, to allow a CPU associated with that particular cache to operate for quite a long time without ever having to access the much slower Global Memory 13.

Whenever a CPU such as 7 outputs an address, if that address is contained in its associated cache memory 9, a "cache hit" is said to have occurred. However, if the address output by the CPU 7 is not contained in the associated cache 9, a "cache miss" is said to have occurred. If relatively few cache misses occur, then a high data throughput is achieved for system 1 because nearly all of the data processing occurs at the high speeds achievable by the CPU 7 as it accesses its associated high speed cache 9. However, if there are a lot of cache misses, then data processing throughput rates are greatly reduced, because the CPU has to frequently access the much slower Global Memory 13 via the bus 6.

It should be noted that when various cache memories are used, as indicated in FIG. 1, each cache contains a part of the "total memory image" stored in Global Memory 13. Another way of looking at this is that various caches contain various "copies" of the memory image stored in Global Memory 13.

Those skilled in the art know that the so-called "store through" technique of operating a cache causes an access to the global memory 13 every time there is a write operation. "Store into" cache techniques do not require access to global memory on every write operation, and result in faster performance. Both of these techniques for operating a cache system require that "cache coherency" be maintained. The cache coherency problem can be stated by asking "How does the system guarantee that at any given time all of the copies of the same address contain the same data"? For example, if CPU0 accesses Cache 0, how does CPU0 know that it is accessing the most "up-to-date" copy, especially if it is known that there are other copies of the same material in Global Memory 13 and possibly in one or more of the other caches each of which has an associated CPU that can modify the material?

A memory system is said to be "coherent" if any access to a portion of memory always returns the most up-to-date copy of the desired portion of memory. Maintaining coherency for data that changes can be very difficult if there are several copies of that piece of data in various cache memories. If one of the copies is changed by one of the CPUs, the other copies become obsolete. The use of obsolete data by a program can create erroneous results that can have disastrous affects. Such errors can be rapidly propagated by the program until the entire system is corrupted. Once detected, finding the cause of the damage is almost impossible because this type of problem usually is non-reproducible.

Prior techniques for ensuring that any of the CPUs is accessing the most up-to-date copy when it accesses a particular address in its own cache may require many extra steps to update the corresponding "original" copy in global memory 13 and to also update all other copies that may be in other caches. Meeting this requirement can substantially reduce the performance of the computer system.

Each CPU of FIG. 1 contains a "Bus Monitor" and a "Bus Master". Each Bus Monitor continuously monitors the addresses on high speed bus 6. Every time a cache miss occurs, its Bus Master and the Bus Monitors of the other caches in the system use or supply the stored V,E,W bits and the corresponding states of the S0 and S1 lines to "resolve" that cache miss and maintain "coherency" of all copies of (1) the information requested by the CPU, the absence of which caused the cache miss to occur, (2) any information that must be moved out of that cache to make room for the requested information when it is received, and (3) the requested information if an up-to-date copy is stored in another cache.

Before further explaining how "coherency" is maintained, it will be helpful to first define several terms.

The act of updating the Global Memory copy of a line of data is referred to as a "write back". There are two types of write backs:

1. Allocate Write Back: The Bus Master writes a modified line (for which W=1) of the CPU cache causing the present cache miss back to the Global Memory 13 in order to make room for the new line of data requested by that CPU which caused the present cache miss.

2. Demand Write Back: A Bus Monitor, in responding to the Bus Master's cache miss and request for a particular piece of data, may recognize that it has a modified (i.e., W=1) copy of that data. The Bus Monitor writes that piece of data both to the requesting Bus Master and to the Global Memory.

Thus, any time a particular CPU and associated cache produce a cache miss, that CPU may have to "clear out" a presently unused line of data in that cache to make room for new data, the absence of which caused the cache miss. If W=1 for the line of data to be displaced, the CPU knows it has the only copy of that modified line, so it can't write over that line of data with the data requested by the CPU. Therefore, the unused, modified line of data must be written back to Global Memory because it is the only up-to-date copy. That is why this kind of write back is called an "allocate write back": it is necessitated by the CPU's need to allocate space in its cache.

Whenever the Bus Master puts out the address that caused the cache miss onto the bus 6, all of the Bus Monitors must look at that address and determine if they have the line of data the Bus Master is trying to obtain. They have to look at their status bits for that address, if they contain it. If a Bus Monitor has the address put out on the bus 6 by the Bus Master, and if the associated status bit is W=1, then the Bus Monitor knows it has the only modified copy of the data requested by the Bus Master. The Bus Monitor then must output that address on the bus, and supply the modified data to both the Bus Master and the Global Memory.

That write back process is called a "demand write back" because it occurs when the Bus Master "demands" the most up-to-date copy of the information.

To solve the above cache coherency problem, the present invention provides the S0 and S1 status lines shown in FIG. 1 and forces all of the CPUs and I/O controllers to operate in accordance with what is referred to as a "Global Coherency Protocol". Tables 1 and 2 show the global coherency protocol by showing the starting and ending states of the V, E, and W coherency bits at the beginning and ending of a cache access.

TABLE 1

(BUS MASTER)

| | STARTING STATES FOR COHERENCY BITS | | | ENDING STATES FOR COHERENCY BITS | | | | | | | |
|---|---|---|---|---|---|---|---|---|---|---|---|
| | | | | LOCAL READ | | | | LOCAL WRITE | | | |
| | V | E | W | BUS COMMAND | V | E | | W | BUS COMMAND | V | E | W |
| Miss | 0 | 0 | 0 | READ | 1 | 1 | if S0, S1=00 | 0 | READ | | | |
| | | | | | | 0 | if S0, S1≠00 | 0 | CLEAR READ | 1 | 1 | 1 |
| Hit for Read | | | | | | | | | | | | |
| Miss for Write | 1 | 0 | 0 | None | 1 | 0 | | 0 | CLEAR | 1 | 1 | 1 |
| Hit | 1 | 1 | 0 | None | 1 | 1 | | 0 | None | 1 | 1 | 1 |
| Hit | 1 | 1 | 1 | None | 1 | 1 | | 1 | None | 1 | 1 | 1 |

TABLE 2

(BUS MONITOR)

| STARTING STATES FOR COHERENCY BITS | | | REPORTED STATE | | ENDING STATES FOR COHERENCY BITS | | | | | | |
|---|---|---|---|---|---|---|---|---|---|---|---|
| | | | | | BUS READ | | | | BUS READ CLEAR | | |
| V | E | W | S0 | S1 | BUS ACTIVITY | V | E | W | BUS ACTIVITY | V | E | W |
| 0 | 0 | 0 | 0 | 0 | None | 0 | 0 | 0 | None | 0 | 0 | 0 |
| 1 | 0 | 0 | 1 | 0 | None | 1 | 0 | 0 | None | 0 | 0 | 0 |
| 1 | 1 | 0 | | | None | 1 | 0 | 0 | None | 0 | 0 | 0 |
| | | | | | Demand Write | | | | Demand Write | | | |
| 1 | 1 | 1 | 0 | 1 | Back | 1 | 0 | 0 | Back | 0 | 0 | 0 |

Table 1 shows coherency bit states that occur in response to a particular request to a particular cache, and also indicates possible necessary bus commands. Table 2 indicates the activities of the bus monitor in response to a bus command issued by the bus master, and more particularly indicates reported S0,S1 states, starting and ending V,E,W coherency bit states, and bus activity caused by that bus monitor.

Tables 1 and 2 will be referred to in the following example, in which a CPU, for example CPU0, generates a local read request on conductors 133 and supplies the corresponding address of location 1000, for example, on conductors 130. Multiplexer 33 routes the address via conductors 132 to the bus master logic circuitry 31. The V,E,W coherency bits of the address, say address 1000, are routed via conductors 140 to the bus master logic circuit 31. Table 1 indicates the operations then performed by bus master logic circuit 31.

If the V,E,W coherency states are 100, 110, or 111, Table 1 indicates that, for a local read request, a cache hit has occurred. (For a cache hit to occur, V must be equal to 1 and there must be a tag compare match, and in the case of a write operation, E must be equal to a 1.) The read data will then be supplied from data storage unit 9B via conductors 130A to CPU0. In this case, Table 1 shows that there is no bus activity required, and the V, E, and W bits in cache 0 remain unchanged.

If the V,E,W coherency state is equal to 000, a cache miss has occurred. Table 1 shows that for a local read command the bus master logic 31 then issues a read command on bus segment 6B. The bus master logic 31 then must read the state of lines S0 and S1. If the S0,S1 state is equal to 00, this means that none of the other caches contain the line of data for address 1000. The bus master 31 then sets its E bit to 1. However, if the S0,S1 state is not equal to 00, it means that another cache does have the line of data for address 1000, and the bus master logic 31 sets E equal to 0. In either case, the data for address 1000 is received, either from the Global Memory 13 or from another cache, and is loaded into address 1000 of data storage unit 9B and is supplied via conductors 130A to CPU0.

For a local write request supplied on conductors 133, the local address is supplied via conductors 130 as described above, and LOCAL DATA TO CACHE is supplied via conductors 131 and multiplexer 34 to data storage unit 9B. As described above, master logic circuitry 31 receives the V, E, and W bits associated with address 1000 and determines if there is a cache miss or a cache hit. The V,E,W states 110 and 111 indicate a cache hit for a local write request, and V,E,W states 000 and 100 indicate a cache miss for a local write request. Notice that for V,E,W state 110, CPU0 may modify this previously unmodified line of data without issuing a bus command because it knows it has the only copy.

For the V,E,W state 100, CPU0 does not know whether it has the only copy, and must issue a read clear command so that after the write operation, CPU0 will be guaranteed to have the only up-to-date copy of the contents of address 1000. If CPU0 performs a local write request and the V, E, W state is 100 a cache miss occurs. It is important for CPU0 to then allocate the same location as a place to put anything you get back from global memory. This is necessary to avoid the possibility of having two locations in the same cache for the same line of data. It is necessary to run a read clear cycle in this case so that CPU0 doesn't modify the line of data without clearing any other copies from other caches. In any case, at the end of a local write request, the V,E,W state must be 111.

Figure 1A:
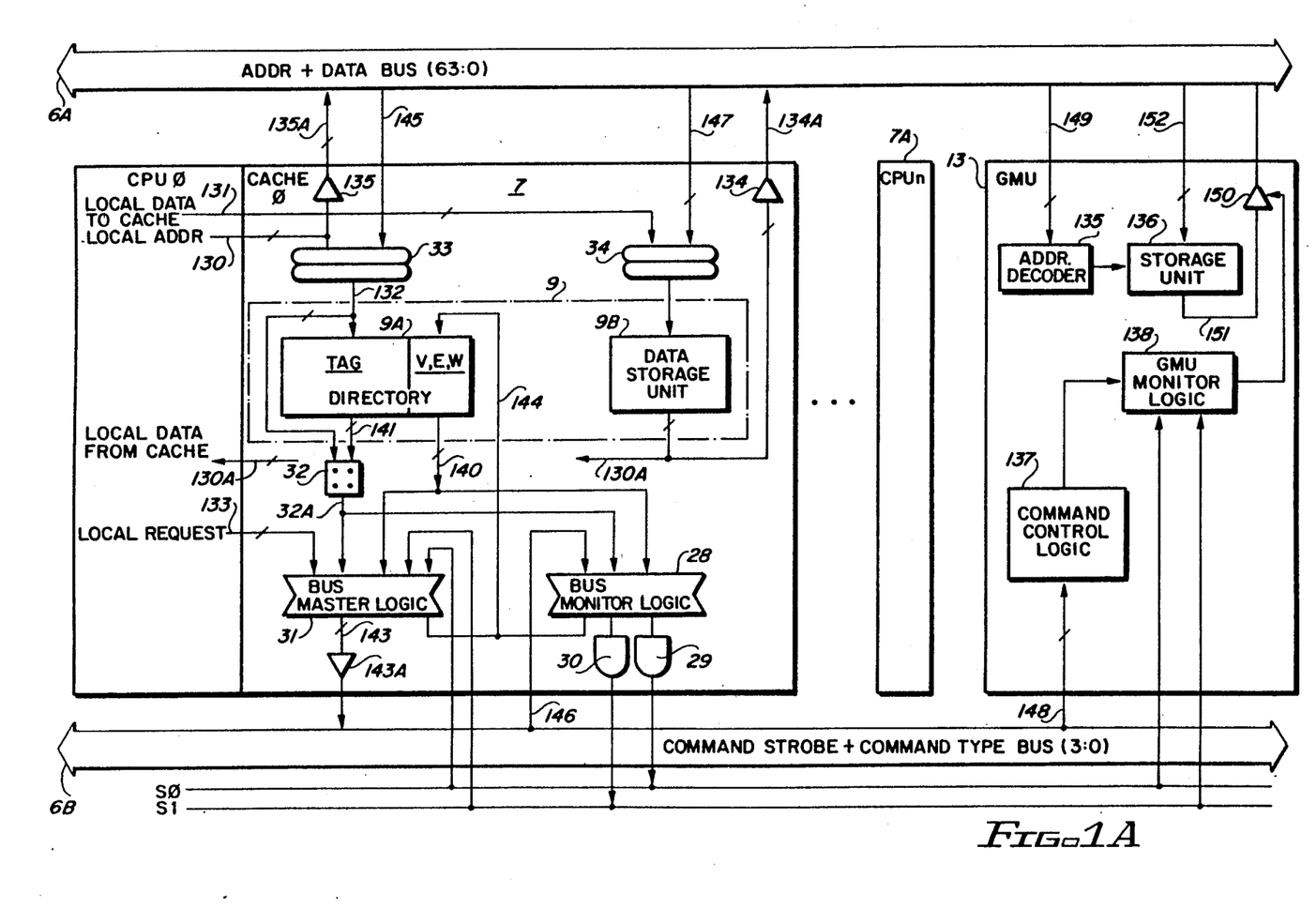
FIG. 1A is a detailed block diagram illustrating bus master logic, bus monitor logic, coherency bit status lines and connections therebetween to effectuate a cache coherency protocol system of the present invention.

Next, the foregoing example will be continued from the viewpoint of the bus monitor logic circuit 28 in FIG. 1A. Bus monitor logic circuit 28 is active only in the event that the bus master logic of another CPU has generated a bus command on bus segment 6B. If that bus command is a bus read, then bus monitor logic 28 receives the bus read command via conductors 146 and receives the corresponding address 1000 via conductors 145, multiplexer 33 and the corresponding V, E, and W bits are received by bus monitor 28 via conductors 140. Then bus monitor logic has the information needed to respond to the bus read command. Note that the bus monitor 28 outputs the S0,S1 states is indicated in Table 2 irrespective of the type of bus command.

More specifically, if the V,E,W state is equal to 000, bus monitor logic outputs the S0,S1 state 00, indicating that its data storage unit 9B does not contain the contents of address 1000. If the V,E,W state is 100 or 110, bus monitor logic 28 outputs the S0,S1 state 10, indicating that it has a unmodified copy of the contents of address 1000. If the V,E,W state is 111, then bus monitor logic 28 outputs the S0,S1 state 01, indicating it has the only up-to-date copy of the contents of address 1000, thereby also indicating that it will supply that line of data in a demand write back to both the requesting CPU and to Global Memory 13. As mentioned above, the fact that the output buffers 29 and 30 are "open collector" (i.e., the output transistors have no pullup devices connected to their collectors) means that the states S0,S1 from all of the CPUs acting as bus monitors are logically ORed, resulting in reporting of the logical union of "1" levels on the S0 and S1 lines.

If the bus command is a bus read, then the ending states for the V,E,W coherency bits of the bus monitor cache are as indicated in Table 2. More specifically, if the bus monitor cache starting state of V,E,W is 000, then there is no bus activity produced by bus monitor 28 on bus segment 6B, and the V,E,W state remains unchanged. If the starting V,E,W state is 100, again there is no bus activity for the bus read command, and the V,E,W state remains 100.

If the starting V,E,W state is 110, there is no bus command produced by bus monitor logic 28. However, bus monitor 28 updates the starting V,E,W states by setting E equal to 0 via one of conductors 144. This is necessary because the bus read command means another cache must have a copy of the contents of address 1000, so the starting state of E equal to 1 must be incorrect and therefore must be set to 0. If the starting V,E,W state is 111, this means that the bus monitor cache has up-to-date copy of the contents of address 1000, and consequently a demand write back operation must occur. The monitor logic 138 of the global memory sees S0,S1 state 01, and knows that another CPU will supply the exclusive copy of the data in the bus monitor cache. Bus monitor 28 now knows that, due to the demand write back operation, it does not have the only copy of the contents of address 1000 and therefore must set E and W to 0. At this point, both the global memory and the requesting CPU have the demand write back data.

Similarly, if the bus command produced on bus segment 6B by the requesting processor is a bus read clear, then the states of S0,S1 lines have the same meanings as for a bus read command. For any bus read clear operation, the V,E,W state in the bus monitor cache must be 000.

As previously indicated, for a reported S0,S1 state of 01, monitor logic 138 of global memory unit 13 turns off buffers 150 so that global memory unit 13 does not supply the requested data, but instead the bus monitor logic 28 supplies the demand write back data.

FIG. 1A shows the bus master logic and bus monitor logic necessary to effectuate the foregoing operation of the cache coherency system. In FIG. 1A, data bus 6 is separated into section 6A, which includes 64 conductors, and section 6B, which includes 4 conductors. Address information (ADDR) and data (DATA) are multiplexed on bus 6A. The four bits of section 6B that indicate "command types" which are output by processor 7 when a cache miss occurs in its associated cache.

The cache coherency logic contained in each processor 7 includes in cache 9 a directory 9A, which includes a tag section and a coherency status bit storage section containing the above mentioned V, E, and W cache coherency bits for each line of data. Directory 9A receives data on conductors 132 connected to the output of a multiplexer 33. Multiplexer 33 has inputs connected via conductors 145 to bus section 6A to receive addresses which are to be compared with physical address tags in directory 9A by means of digital comparator 32. The data output conductors of the tag section of directory 9A are connected by conductors 141 to corresponding inputs of comparator 32.

A local address generated by CPU0 is produced on conductors 130, which are connected to inputs of multiplexer 33 and to the input of a buffer 135, the outputs of which are connected to the respective conductors of bus section 6A.

The output of digital comparator 32 indicates a cache hit if there is a match between the physical address tag in directory 9A and the local address (LOCAL ADDR) on conductors 130. The cache hit signal is generated on conductors 32A and applied to the input of bus master logic 31, which produces an appropriate command via conductors 143 and buffer 143A to bus conductors 6B. Bus master logic 31 produces outputs on conductors 144 connected to inputs of directory 9A needed to set new values of the V, E, and W status bits of the presently addressed tag in directory 9A. The values of V, E, and W for the presently addressed tag in directory 9A are output on conductors 140 to corresponding inputs of bus master logic 31 and bus monitor logic 28. A "LOCAL REQUEST" command on conductor 133 initiates operation of bus master logic 31 to perform a read or write data request.

Bus monitor logic 28 receives a "command type" signal from bus section 6B via conductors 146, during bus monitor operation in response to a command output by bus master logic of a different processor such as 7A. Two open collector buffer circuits 29 and 30 connect outputs of bus monitor logic 28 to the S0 and S1 conductors, respectively. The S0 and S1 conductors also are connected to two corresponding inputs of bus master logic 31. The wire ORing previously referred to is accomplished by the open collector buffers 29 and 30 of each of the processors such as 7 connected to bus 6 and to the state conductors S0 and S1, so the bus monitor logic of all processors in the system except the one acting as a bus master cooperate to produce the logical union of the V, E, and W coherency status bits of those caches responding to a command type produced by the bus master.

The cache 9 of processor 7 also includes data storage unit 9B, data outputs of which are coupled to LOCAL DATA FROM CACHE conductors 130A and are also coupled by buffers 134 to bus section 6A. The data inputs of data storage unit 9B are connected to outputs of multiplexer 34, one set of inputs of which is connected by conductors 147 to corresponding conductors of bus section 6A. Another set of inputs of multiplexer 34 is respectively connected to conductors of LOCAL DATA TO CACHE bus 131.

Global memory unit 13 includes a simplified bus monitor including monitor logic 138 having inputs connected to the S0 and S1 lines, respectively, and producing an enable signal to a buffer circuit 150 that connects the data output conductors 151 of global memory storage unit 136 to appropriate conductors of bus section 6A. The data input conductors and the address inputs to the global memory storage unit 136 are generated by address decoder 135, the inputs of which are connected by conductors 149 to appropriate conductors of bus section 6A. Command control unit 137 of global memory unit 13 is connected by conductors 148 to the conductors of bus section 6B to enable command control logic 137 to respond appropriately to commands on bus section 6B.

Thus, in the event of a local address being produced on conductors 130, multiplexer 33 applies the address on conductors 130 to directory 9A, which determines if there is a cache miss. A local request signal is applied via conductor 133. If there is a cache hit, the V, E and W bits of the addressed location are passed via conductors 140 to the bus master logic 131, which determines if there is a need to output a command on bus section 6B to ensure cache coherency.

If there is a cache miss, a read request, a read clear, and/or an allocate write back command will be output on bus section 6B. Depending upon the results obtained back on the S0 and S1 lines from the bus monitor logic of all other processors such as 7 connected to bus 6, the bus master logic circuit 31 determines whether to change its values of V, E, and W and accordingly sets them to new values via conductors 144.

If CPU0 is acting as a bus monitor instead of a bus master, the command output on bus section 6B by the bus master 31 is received via conductors 146 by bus monitor logic 28, and the address is received via conductors 145 and multiplexer 33.

At this point, the bus monitor logic 28 knows what the command on bus section 6B was, and it knows the result of the directory being addressed via conductors 145 by the address output by the bus master on conductors 135A. The bus monitor also knows the values of the V, E, and W bits received via path 140, and wire ORes them via open collector buffers 29 and 30 to the S0 and S1 lines. If the bus master is doing a "read clear" operation, the bus monitor sets the V, E, and W bits for the present address to 0, so that the bus master is guaranteed that it has the only copy of the present line of data. If the command on bus section 6B by the bus monitor is a simple read command, the bus monitor logic 28 may or may not modify the V, E, and W bits of the present line of data. Data is moved into and out of data storage unit 9B as needed via conductors 147 and 134A.

To summarize, the monitor recognizes a command put out on bus section 6B by the bus master, searches its cache directory, determines if it contains the associated information for that address, makes the states of V, E, and W available via the wire ORed state lines S0 and S1, makes necessary changes, to the states of V, E, and W, and makes its data available if its W bit is equal to 1 (i.e., performs a demand write back).

Every time a command is output on bus section 6B by a bus master, command control logic 137 of the Global Memory 13 initiates a read of the current address on bus section 6A via address decoder 135. Monitor logic 138 monitors the states of the S0 and S1 lines. Therefore, no coherency status bits are required in Global Memory 13. Depending on the state on the S0 and S1 lines, the bus monitor logic 138 determines whether to turn the output drivers 150 of the global memory storage unit 136 on or off.

OPERAND CACHE STRUCTURE

Figure 2:
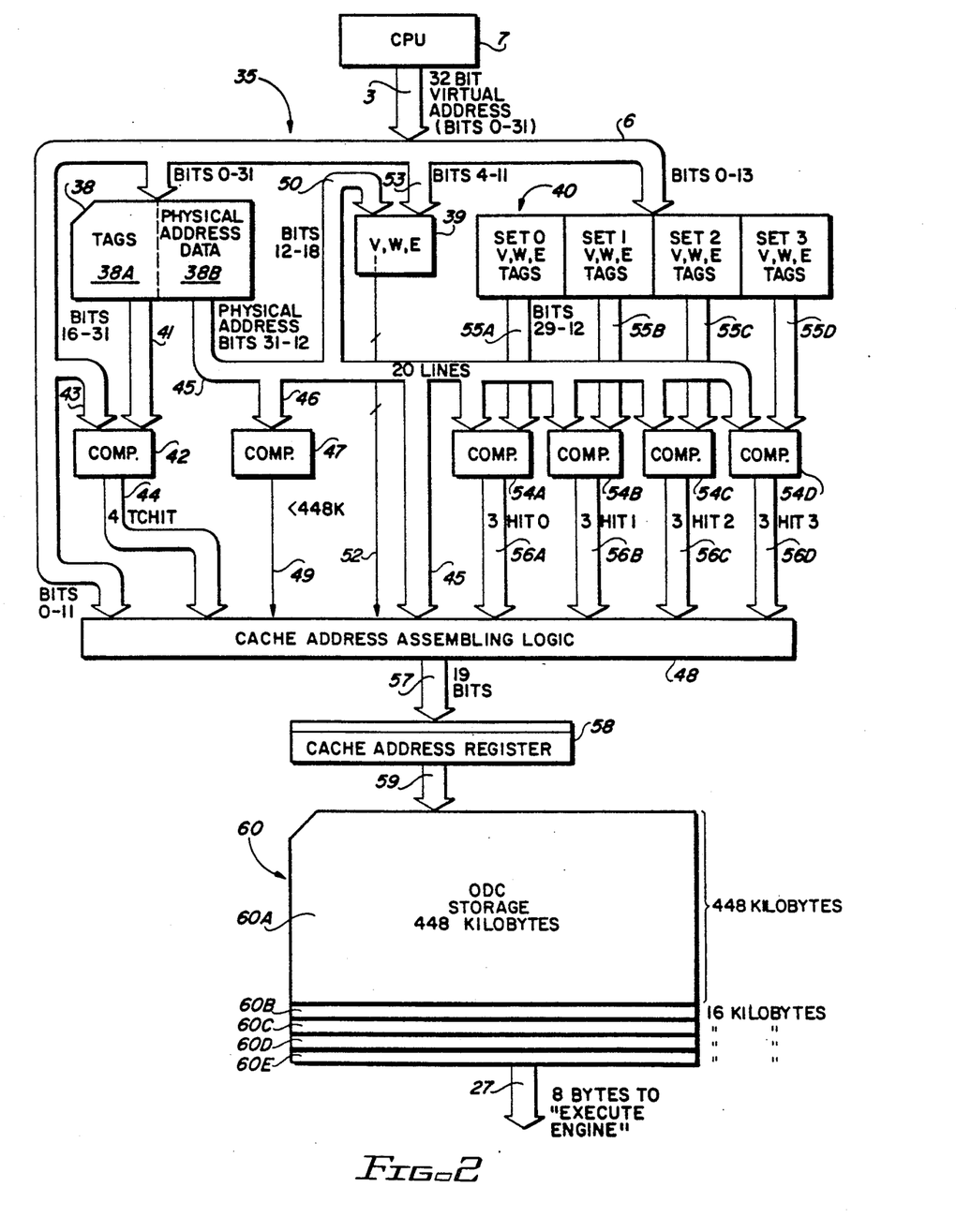
FIG. 2 is a block diagram of an operand cache of the present invention.

In FIG. 2, reference numeral 35 designates everything except CPU (Central Processing Unit) 7. CPU 7 generates a 32 bit "virtual address" which does not necessarily need to be equal to the "physical addresses" that actually gets decoded to address a physical memory. In FIG. 2, a translation cache 38 translates the virtual addresses ("transparently" to the program) on bus 6 into physical addresses, including 20 physical address bits on bus 45. Section 38A of translation cache 38 stores physical addresses called "Tags". Each 32 bit virtual address on bus 6 includes a "Look-Up" portion and also contains a "Tag Comparison" portion. The Look-Up portion of each 32 bit virtual address accesses a particular Tag in section 38A and its associated physical address data in section 38B. The Tag Comparison portion of each virtual address is applied by conductors 43 to the input of a digital comparator 42. Other inputs of digital comparator 42 receive the bit 41 of the accessed Tag.

If the Tag Comparison portion of the virtual address matches the accessed Tag present on line 41, a translation cache "hit" signal is produced on lines 44, which include 4 bits. The TC Hit signal on Conductors 44 is applied to inputs of Cache Address Assembling Logic 48. The purpose of Cache Address Assembling Logic 48 is to generate a Cache Address which then is stored in Cache Address Register 58, the output lines 59 of which are used to physically access the Operand Cache Storage Memory 60, which stores 512 kilobytes.

It should be noted that cache memories usually are "multiply mapped". That is, different portions of the total memory image stored in the Global Memory 13 (FIG. 1) can be stored in a multiply mapped cache memory which usually is much smaller and much faster than the Global Memory and can be operated at the same speed as an associated CPU.

In FIG. 2, Operand Cache 35 contains two distinct sections, one being called an Operand Direct Cache (ODC), and the other being a 4-set Operand Associative Cache (OAC). The ODC and the 4-Set OAC each have a separate directory, but share a common high-speed Cache Storage Memory 60.

The Operand Associative Cache Directory (OAC Directory) 40 contains four associative sets, namely Set 0, Set 1, Set 2, and Set 3, all of which are accessed by bits 0-13 of the Virtual Address. Note that physical address bits 0-13 are mapped to be equal to virtual address bits 0-13. Each of Sets 0, 1, 2, and 3 contains a physical address Tag similar to the ones described above, and also contains the V, E, and W bits.

Bits 4-11 of the Virtual Address Bus 6 are input to the ODC Directory 39, which also contains the V, W, and E bits for each entry. Bits 12-18 of the physical address bus 45 also are input to ODC Directory 39. The V, E, and W bits output by ODC Directory 39 are input on lines 52 to Cache Address Assembling Logic 48. Note that the ODC directory 39 does not need to have address tags, as subsequently explained.

Eighteen high order bits 12-29 of each of Set 0, Set 1, Set 2, and Set 3 of OAC directory 40 are output on buses 55A, 55B, 55C, and 55D, respectively, to inputs of Digital Comparators 54A, 54B, 54C, and 54D, respectively. Bits 12-29 (i.e., the Tags) of physical address bus 45 are also applied to other inputs of digital comparators 54A-54D. Each of the comparators produces three output lines on which "HIT 0", "HIT 1", "HIT 2", and "HIT 3"signals are produced if data corresponding to the 32 bit virtual address is in the Associative Cache portion 60B, 60C, 60D, or 60E respectively, of Operand Cache Storage 60. The HIT 0 . . . HIT 3 signals are input to Cache Address Assembling Logic 48. Since the physical address range has been separated into two non-overlapped portions as indicated above, cache address assembling logic 48 can produce a cache address by passing the physical address bus 45 directly to cache address register 58 if a physical address is less than 448 kilobytes. Otherwise, cache address assembling logic 48 encodes the associative cache hit signals hit 0-3 to generate some of the cache address bits, and sets others to preselected states.

The above-described direct mapped/multiply mapped Operand Cache saves a great deal of data processing time by avoiding the need for a CPU such as 7 to access the slow Global Memory unit 13. If the cache memory being used by a CPU contains nearly all of the instructions and data needed by the CPU for quite a long period of time, that is, if nearly every memory access is a "cache hit", very efficient, high-speed operation is achieved. Obviously, the smaller that high-speed cache memory is, the more likely a particular memory access will result in a cache miss, rather than a cache hit.

Every cache miss is very time-consuming because the slow Global Memory must then be accessed. One way to increase the so-called "hit ratio" is simply to make the cache memory larger, making it more likely that the accessed address is in the cache. Obviously, this is costly, because of the expense of additional high-speed cache memory storage elements, and also because many practical system design implementation problems occur when cache memories are made larger. The necessity of making larger, more complex cache directories is an important component of the additional cost incurred by making cache memories larger.

A problem faced by the inventors was simply that before the present invention, they were unable to provide a large enough, fast enough cache memory to match the speed of their CPU's. More specifically, the 64 kilobytes of cache storage in sections 60B-E of FIG. 2, which are associated with the 4-Set Operand Associative Cache Directory 40, alone are inadequate to avoid a large number of operand cache misses.

FIG. 2 shows an implementation of the concept of sharing of data storage for a direct, one-to-one mapped portion of the Operand Cache with the storage for a multiply mapped portion of the same Operand Cache. By mapping the first 448 kilobytes of the remote slow Global Memory 13 directly, on a one-to-one basis, into the direct mapped portion of the Operand Cache, it is possible to increase the size of the Operand Cache from 64 kilobytes (Sections 60B-60E) to 512 kilobytes merely by the addition of a simple ODC Directory 39 and a Digital Comparator 47. The need to store Tags in the ODC Directory 17, and the need to provide the additional memory and hardware for storage of Tags is avoided, saving a great deal of cost and complexity. Although this technique imposes some constraints on use of the Operand Cache, a substantial improvement in performance is achieved by greatly reducing the number of operand cache misses for the types of programs that would ordinarily be run on a stack-based CPU. This is accomplished at a much lower cost than would be the case if the Operand Cache Storage is increased from 64 kilobytes to 512 kilobytes all of which could be multiply mapped into by the entire Global Memory 13.

The operand cache 35 described in FIG. 2 can be used to efficiently handle "stack transactions". Before explaining how, it will be helpful to note that the instruction set of a computer system may specify a stack-based architecture. What this means is that a part of memory called the "stack memory" is extensively utilized as programs are executed to pass information between various subroutines of the program being executed. A subroutine generating a piece of information "pushes" it onto the stack, a stack pointer is indexed to point to the top of the stack memory, and the subroutine to receive the information then reads the location containing the information to be received from the first subroutine. When the information is no longer needed, it is "popped" from the stack (by moving the stack pointer somewhere else and overwriting the old information when its space is needed).

In many programs, a very large number (usually at least 30 to 60 percent) of references to operands involve stack transactions. In some cases, nearly one hundred percent of operand references involve stack operations. Therefore, it would be very desirable to avoid the need to move "stack frames" (i.e., portions of memory address space allocated to be used as a stack memory for each resident program being executed by the computer) into and out of the operand cache.

For a computer system to execute a large number of separate resident programs on a time-shared basis, a large number of stack frames is required, one for each resident program. If the operand cache is small, it would be necessary to frequently move corresponding stack frames into and out of operand cache as time-shared execution of the various resident programs occurs. Consequently, there would be a large number of time-consuming operand "cache misses", and consequently a lot of additional "traffic" on the high-speed bus 6 connecting the CPU 7 and Global Memory 13 (see FIG. 1) associated with stack transactions.

The solution to the problem is to provide the above described large, direct mapped portion of the operand cache, namely the ODC directory 39 and associated ODC storage 60A, so that all or most of the stack frames can be loaded therein and kept therein for the entire execution time of all of the resident programs. Cache misses and bus traffic associated with stack transactions is thereby minimized, and computer performances greatly enhanced.

INSTRUCTION CACHE

Figure 3:
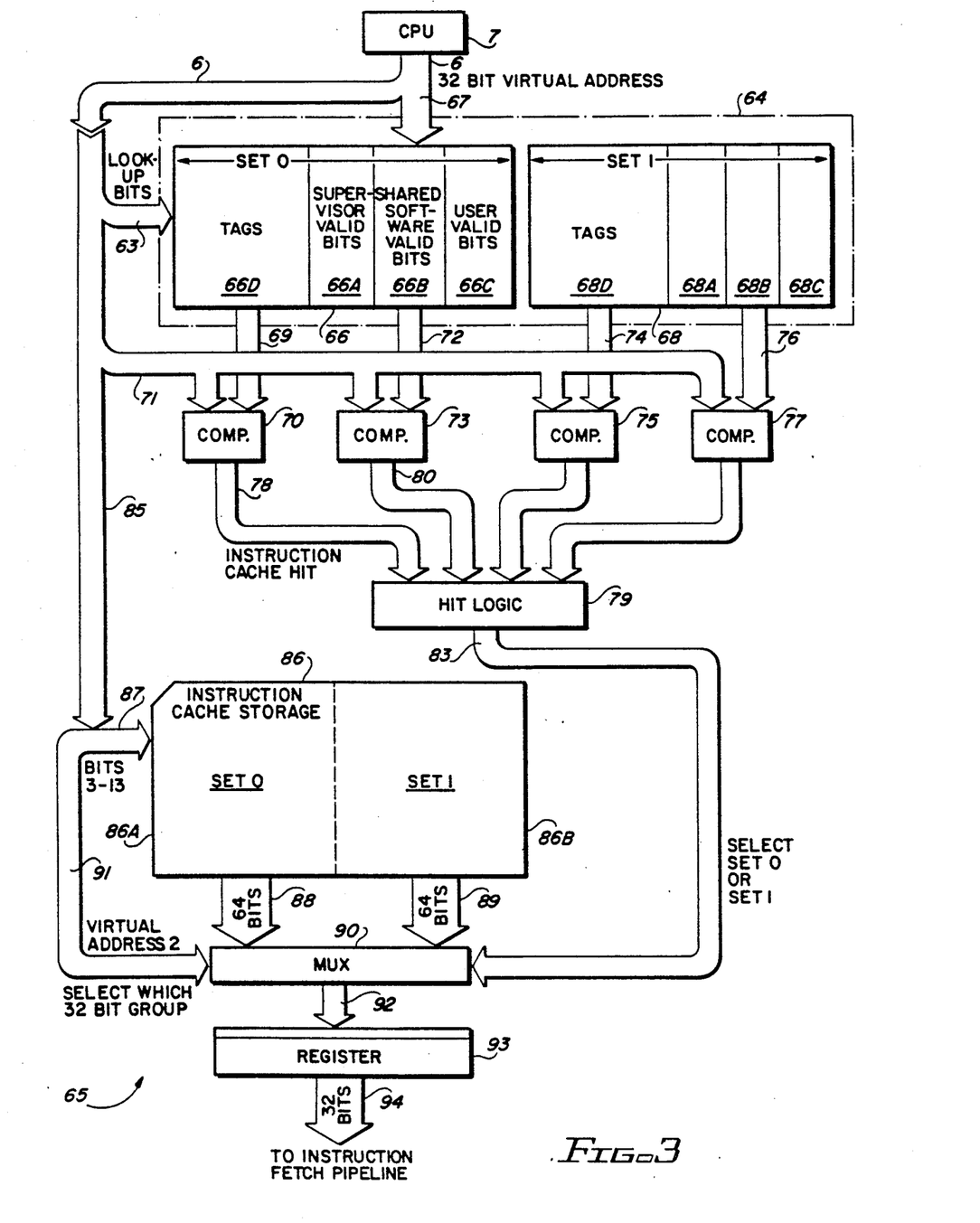
FIG. 3 is a block diagram of an instruction cache of the present invention.

In FIG. 3, numeral 65 designates an "Instruction Cache" that is tightly coupled to a high speed CPU designated by 7. CPU 7 generates a 32 bit virtual address on bus 6 which addresses Instruction Cache 65. This means that every time the user is changed, it is necessary to "clear" Instruction Cache 1. This is a problem because if programs of two users are being executed, each time a different user needs to use the Instruction Cache 1, it is necessary to completely "clear" the Instruction Cache 1 and reload it with instructions for the new user. This necessitates accessing the much slower Global Memory 13 (FIG. 1) to fetch the new instructions. (Note that when a number of users share a single cache which is multiply mapped from the Global Memory, each user "thinks" it has complete access to the entire Global Memory, only a small part of the contents of which are presently loaded into the cache. If different users, i.e., programs, are running and sharing the code, each may be using the same virtual address to fetch different instructions from the Instruction Cache, necessitating clearing the Instruction Cache for the different users or programs.)

Instructions when fetched from global memory on instruction cache miss and loaded into the Instruction Cache 65 all are "categorized" into three categories, namely (1) instructions used for the "Supervisor", (2) instructions used for executing a "Shared Software Structure" (i.e., a subroutine such as a square root subroutine of which there is only one copy that is stored by all CPUs), and (3) instructions for a "User Structure" (i.e., all instructions other than the Supervisor instructions). Each instruction in the Instruction Cache 65 has associated with it three "valid" bits indicating whether the instruction at a particular address is for a Supervisor instruction, a Shared Software Structure instruction, or a User Structure instruction, respectively, in portions 66A, 66B, and 66C of a first set 66 of an Instruction Cache Directory 64.

Then, every time the software being executed by CPU 7 switches the User, the Operating System, or a Shared Software Structure, the Instruction Cache 65 uses the three "valid" bits to "clear" only the corresponding category of instructions in the instruction cache 65. Note that clearing a category consists of merely clearing the valid bits corresponding to that category to "O"s, so that if an address of an instruction in a cleared category is output to the Instruction Cache 65 by its CPU, a cache miss will occur.

In FIG. 3, numeral 64 designates the Instruction Cache Directory, which includes two sets 66 and 68, also designated Set 0 and Set 1. Set 0 in block 66 includes a section 66D in which previously entered Tags are stored. Each 32 bit virtual address contains a number of "Look-Up" bits 63 and also a number of Tag Comparison Bits 67. The Look-Up bits of each 32 bit virtual address selects one of the tags stored in sections 66D. A comparator 70 then compares the accessed Tag bits with the Tag Comparison Bits of the present virtual address, and if there is a match, comparator 70 produces information 78 indicating the occurrence of an instruction "cache hit", which information is input to Hit Logic 79.

Set 0 also contains for each lookup address: (1) a Supervisor valid bit, (2) a Shared Software valid bit, and (3) a User valid bit in sections 6A, 6B, and 6C, respectively. For the location presently accessed by the lookup bits 63 of the virtual address 6, the accessed Tag is being output on conductors 69 while the corresponding three "category" valid bits 66A, 66B, and 66C are being output on conductors 72 to digital comparator 73. These "category valid" bits are compared with the machine state (i.e., Supervisor or User and "private" or "shared" page bits) on conductors 71. If the "category" of valid bits on conductors 72 matches the machine state bits on conductors 71 and the Tag matches the Tag Comparison Bits, digital comparator 73 then produces "Hit" signals on conductors 78 and 80, which are input to the Hit Logic 79. It then produces a select signal on conductor 83 which is used to select which of Set 0 and Set 1 is multiplexed to register 93.

The structure and operation of Set 1 in block 68, tag section 68D, "category valid" bits 68A, 68B, 68C, conductors 74 and 76, and digital comparators 75 and 76 is, entirely analogous to set 0.

If there is an instruction cache miss, a modified Least Recently Used (LRU) algorithm makes a decision which of Set 0 and Set 1 to clear as follows: (1) if either of Set 0 empty, it writes the new instructions from the Global Memory into that set, (2) if both Set 0 and Set 1 are not empty, and either of Set 0 or Set 1 is of a different mode (i.e., Supervisor, Shared, or User) than the present mode, write the new instructions from the Global Memory into that set, and (3) if both Set 0 and Set 1 are valid and are of the same mode as the present mode, then write the new data from the Global Memory 13 into the least recently used set. For every line of data in Set 0 and Set 1 a separate single bit is provided which identifies the set most recently accessed.

The addressed instruction is assembled in block 90, which performs the physical function of multiplexing the selected one of Set 0 and Set 1 and loading it into register 93. As indicated by lines 94, the outputs of register 93 feed the instruction to an instruction fetch pipeline.

I/O CACHE TECHNIQUES

Figure 4:
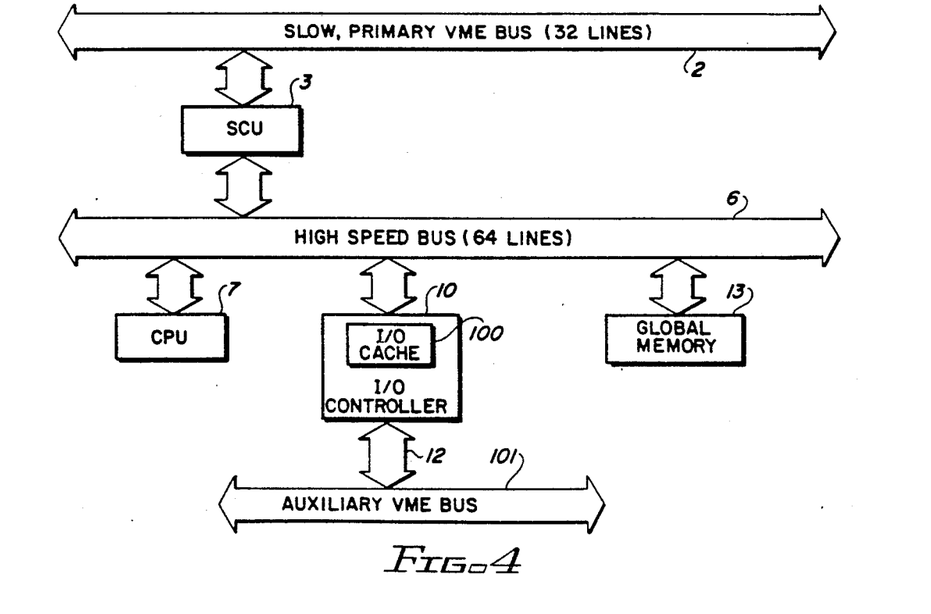
FIG. 4 is a block diagram useful in explaining the I/O cache techniques of the present invention.

FIG. 4 shows a simplified block diagram in which a slow VMEbus 2 containing 32 lines is coupled to system controller unit (SCU) 3. SCU 3 is connected by a high speed bus 6 containing 64 lines. A CPU 7, I/O controller 10 containing an I/O cache memory 100, and a Global Memory 13 all are coupled by bidirectional busses to the high speed bus 6. I/O controller 10 is also coupled by a bus 12 to a slow auxiliary I/O bus 101, which may be a VMEbus.

Certain facts which are generally true about input-/output (I/O) data streams of the type that occur on bus 12 have led to different cache structures and techniques for an I/O cache of an I/O controller such as 10. As is true with all caches, I/O cache 100 permits a plurality of different slow I/O devices (not shown) connected to auxiliary bus 16 to "think" they are addressing Global Memory 13. I/O data usually consists of long, sequential streams of 8, 16, or 32 bit data items, to be transferred to or from a slow peripheral device, such as a disk unit. After the data is transferred, it does not normally get re-used by other active devices on the I/O bus 101 soon, so often there is no need to preserve it in the I/O cache 15. I/O data transfers ordinarily are very slow compared to the rate at which data may be transferred to or from Global Memory 13.

Use of the I/O cache 100 allows 16 byte reads or 16 or 64 byte writes to or from Global Memory 13 in a single cache access operation, rather than inefficiently requiring a separate 16 byte global memory access for each byte, word, or long word of I/O data transferred on I/O bus 12. I/O cache memory 100 includes 256 locations or "page buffers" such as 102, each of which is 64 bytes long. Thus, I/O cache 100 can store 64×256=16,384 bytes of data.

Each of the 256 I/O cache locations 102 (FIG. 5) can hold 64 bytes of data. Each I/O cache is divided up into 256 64-byte sections which are addressed by using bits 12-19 of the I/O address from bus 101. These bits 12-19 are the page addresses of the 32 bit physical address (bit 1 being the least significant bit) and are used as the look-up part of the physical address. Bits 6-11 and bits 20-29 of the I/O address are used as a TAG field for each location to resolve multiply mapped addresses. During a continuous I/O transfer, this structure causes a 64 byte location of the cache to be reused wherever the transfer address reaches a 64 byte boundary (within a page), while old data in the cache location is automatically "bumped" back to global memory 13 via an allocate write back operation. Thus, each 64 byte section of the cache 15 acts like a 64 byte I/O buffer during the transfer of a 4,096 byte page of data to or from the I/O bus 101. This differs from prior caches, because prior caches are usually addressed with bits of lower order than bits 12-19; in most other caches there is a need for lower order addresses to be grouped together because closely grouped low order addresses are likely to be re-accessed soon in executing most programs.

There is no way of distinguishing between different I/O transfers on the same bus except by looking at and evaluating the addresses. It is known that most I/O transfers are to different page addresses, so subdividing the I/O cache into 64 byte sections that themselves are addressable by different page addresses reduces the likelihood that two different ongoing I/O operations will simultaneously attempt to address the same I/O cache location.

Figure 5:
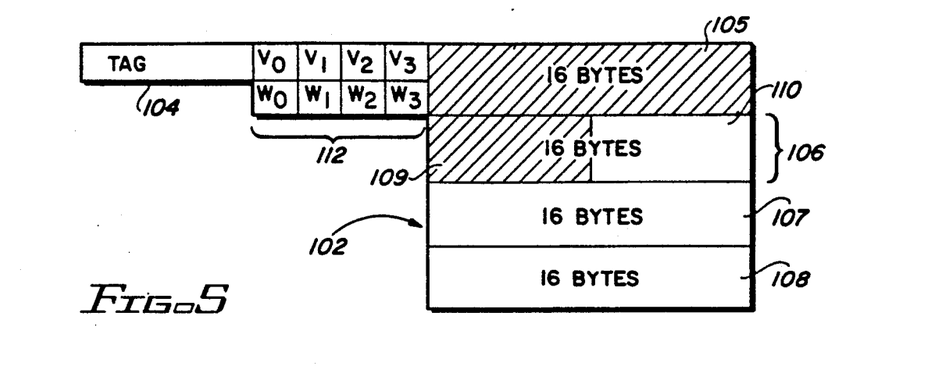
FIG. 5 is a block diagram useful in describing zoning techniques used in the I/O cache techniques of the present invention.
Figure 5A:
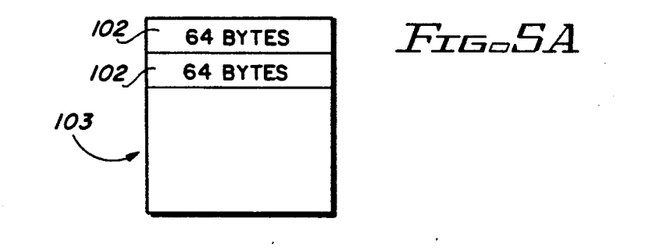
FIG. 5A is a diagram useful in illustrating a page mapped I/O cache structure of the present invention.

Most of the time the page-mapped structure 103 shown in FIG. 5A will eliminate the problem of one I/O device arbitrating for control of the I/O bus 101 and "bumping" another I/O device that is presently accessing the same location in I/O cache 100, thereby avoiding time consuming "allocate write back" operations of data from a bumped I/O device from I/O cache 15 to global memory 13 before the new I/O device can access I/O cache 100.

The above structure raises the question "How can I/O cache 100 carry out a 64 byte transfer in a single I/O cache access, since a 16 byte 'demand write back' may occur in which another I/O on the global memory bus 6 device may take control of the bus and try to access the same cache location in the middle of the 64 byte transfer?"

The answer is by "zoning", which is illustrated in FIG. 5A, and is thought to be novel in the context of I/O controllers. In FIG. 5A, each individual I/O cache location 103 is "zoned" into four 16 byte sections, each having its own "valid" and "written" status bits 112. Each address has a single TAG 104 which is compared with lookup bits of a physical address. Each I/O cache location 102 also includes four 16 byte lines 105, 106, 107 and 108, i.e., a total of 64 bytes of data. It should be noted that the minimum read transfer or write transfer on the high speed bus 6 of FIG. 4 is 16 bytes. Consistent with the overall system cache coherency protocol described above with reference to FIG. 1, each 16 byte line 105, 106, 107, and 108 has associated therewith two status bits $V_0$ (valid), $W_0$ (written), $V_1$, $W_1$, $V_2$, $W_2$ ... etc.

Figure 6:
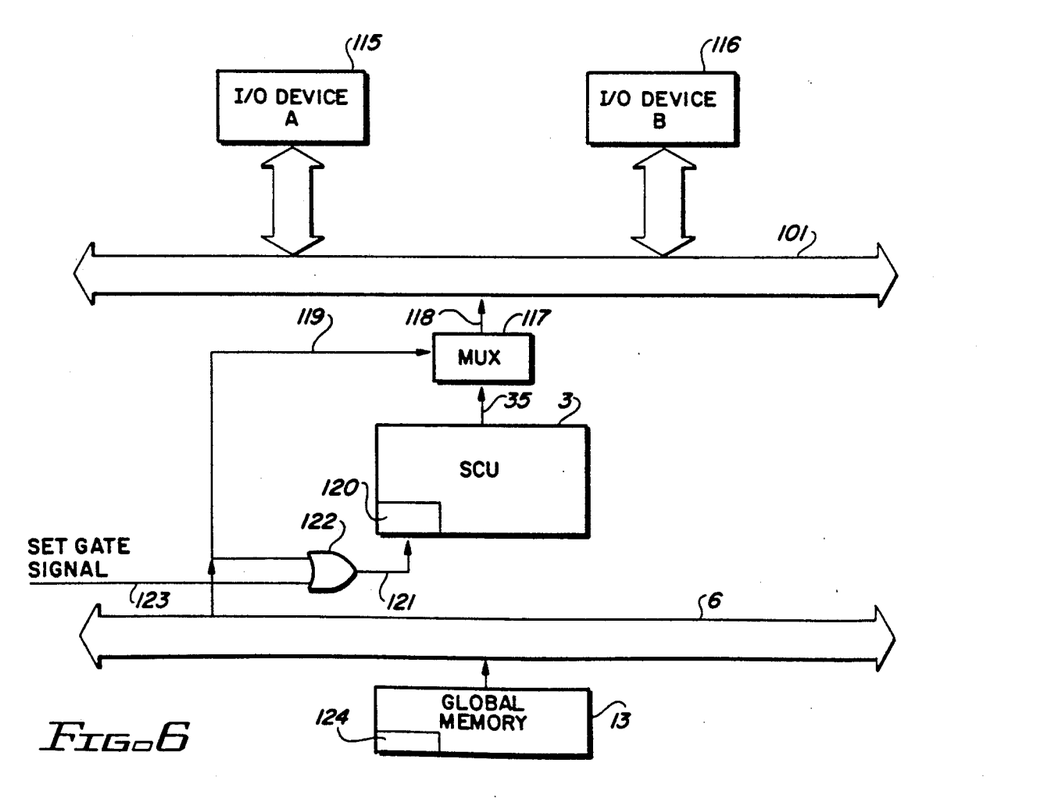
FIG. 6 is a block diagram useful in explaining a technique used by the I/O cache of the present invention to speed up I/O locks on a shared resource.

The hardware of the computer system is capable of doing memory read and write operations only on 16 byte chunks of data. For large, slow sequential streams of I/O data, it is very convenient to be able to transfer 64 bytes of data in a single cache transfer in order to increase the global memory bus 6 "bandwidth", and hence special 64 byte allocate write back operation to global memory is provided. By allowing each 64 byte location in the I/O cache to be zoned into 16 byte quantities, the I/O cache is able to handle the regular 16 byte global memory bus operation (e.g. reads, demand write backs), as well as a high speed 64 byte allocate write back, which is possible only when all 4 valid bits 20 in a cache location 102 are set.

Usually, if data is written into a cache, one must be concerned about destroying prior data in the address locations of the cache. If such data must be preserved, an "allocate write back" operation as described above must be performed on the Global Memory 13 before new data is written into that cache location.

The purpose of a so-called "block write" bit can be understood in light of the following discussion. Assume an I/O device on bus 101 transfers data via bus 12 to I/O controller 10 and hence to I/O cache 100. Recall that the computer can only perform memory accesses on 16 byte chunks or lines. Also suppose that the I/O transfer of arbitrary length is writing into global memory and does not end on a 16 byte address boundary and that the data in the unused portion of the last 16 byte line in Global Memory 13 needs to be preserved. In such an operation, it will be necessary to:

(1) read the corresponding 16 byte section into which the last bytes of the I/O transfer will be made to preserve the data that might be in the unused portion of the 16 byte line in Global Memory 13. Assume, for example, in FIG. 5, that numeral 109 designates the final 8 bytes written into 16 byte section 105, 106, 107, 108. Numeral 110 designates the unused portion at the time the need to perform the read/modify/write instruction occurred;

(2) overwrite the 16 byte section 105, 106, 107, 108 with the final 8 bytes from the I/O bus 101; and (3) write the 16 byte section 106 to Global Memory 13.

This three step procedure is very time consuming, and since I/O transfers on the VMEbus 101 give no indication of when a transfer is completed, it must be assumed that every data item transferred could be the last one. Hence, this read/modify/write procedure must be repeated every 16 bytes throughout the I/O transfer, resulting in great inefficiency. If there were some way of knowing that it is unnecessary to preserve data remaining in the unused portion 110 of the last line, a lot of time could be saved by avoiding the 3-step process each time 16 bytes of data are transferred. In accordance with the present invention, the above mentioned "block write" bit is stored in SCU 3. If this block write bit is set, the system knows to simply overwrite data onto the present cache location 103 without bothering to do the above-described time-consuming three step global memory transfer. Thus, for I/O controller 10 there is a stored "block write" or "overwrite" bit that dictates whether data in the unused portion of the last line of a software I/O buffer in memory needs to be preserved (and hence cannot be overwritten), and high order bits in the physical address are used to access 64 byte sections of each page, using a different page address for each 64 byte section.

As in any multiply mapped cache, there can be times when an I/O cache transfer is interrupted. Then there is a need to not destroy data presently in the I/O cache due to overwriting by the new processor accessing the I/O cache, so it is necessary to have a technique that efficiently determines when incoming I/O data can be overwritten into the 64 byte sections 18 and when it cannot. This is accomplished by an "overwrite algorithm" of the present invention. Suppose that two users, which we will call I/O device A and I/O device B, contend for the same multiply mapped I/O cache location. If I/O device A is accessing an I/O cache location 102 and I/O device B successful arbitrates for bus 101, I/O device A gets "bumped". The amount of data that I/O device succeeded in writing into the cache location before being bumped, for example, the shaded portions of 16 byte lines 105 and 106 in FIG. 5, is transferred into a corresponding software buffer stored in the global memory. I/O device B then takes over bus 101 and fills up the same cache location. I/O device A then, when it gets the bus 101 back, faces the problem of how it is going to write the rest of the original data transferred into the present page 103 (FIG. 5A) of the I/O cache 100. Note that it would be very difficult and time consuming for I/O device A to completely start over at the beginning of 16 byte line 105.

In accordance with the above overwrite algorithm, and assuming that the above "block write" bit has been set, the only time that I/O device A is allowed to overwrite all 64 bytes in a particular I/O cache location is if I/O device A wrote into Byte 0 of 16 byte line 105, in which case it at that time sets all four status bits 112 to their proper values. This indicates that I/O device A is now "claiming" all 64 bytes in that cache entry. At the same time a "four line clear" command is sent over bus 6 to clear the status bytes for that page-mapped location to be cleared out of all other I/O caches, to ensure that the present 64 byte block of addresses cannot be "claimed" as an I/O "buffer" by any other I/O controller connected to bus 101.

Any time that I/O device A starts a new transfer into an I/O cache location other than at byte 0 thereof (e.g., on resuming its transfer after being bumped by I/O device B) then the four status bits 112 will not be set simultaneously, but one at a time, as I/O device A begins writing into each of the 16 byte subdivisions 106, 107, and 108. Before beginning writing into each 16 byte section, I/O device A performs a read of the corresponding 16 byte location in Global Memory 13 to ensure that any old data that has been bumped back into Global Memory 13 will be preserved.

In short, anything less than an entire 64 byte transfer has to be transferred 16 bytes at a time. As soon as a transfer of less than 64 bytes is finished, a four line clear command will be issued over bus 6, the old data will be transferred via the allocate write back operation 16 bytes at a time, a transfer at byte zero of location 102 will be begin, and transfer of data in 64 byte chunks will continue.

It now has been described how (consistently with the cache coherency requirements of the system) I/O data transfers to Global Memory 13 are accomplished 64 bytes at a time as the sequential I/O data stream fills up 64 byte I/O cache locations, and, if a transfer is interrupted, subsequent transfers from that I/O cache location occur only 16 bytes at a time until the start of the next 64 byte block.

At this point, it should be noted that I/O transfers on VMEbus 101 do not include an "end of transfer" signal. At the end of the I/O transfer, no self-bumping occurs for the last 1-64 bytes transferred (wherein at the time of transferring new data into the first byte of the next 64 byte locations, the entire contents of that 64 byte location are transferred to Global Memory 13). Thus, at the end of the I/O transfer, there is no way of generating a signal that writes the rest of the data already in the 64 byte location to global memory, since this signal is normally generated by the continuation of the transfer.

However, in accordance with the present overwrite algorithm, the earlier described cache coherency system automatically solves this problem, because the last amount of data simply stays in the unfilled I/O cache location until it is needed, i.e., when a demand write back operation occurs, which automatically effectuates transfer of the final bytes of I/O data to Global Memory 13.

Another aspect of the I/O cache can be described with reference to FIG. 6, but first, it is necessary to understand what is commonly referred to as a "gate", also known as a "flag" or a "lock" in a situation wherein several devices may need access to a particular "resource" which can be accessed by any active device in the system, but can be only used by one active device at a time. An "active device" can be an I/O device, a CPU, or any other device containing a microprocessor and executing a program. An example of a "resource" might be a printer driver, which is a program that operates an ordinary printer. Ordinarily, only one processor at a time can "claim" or use a printer. If two processors succeed in simultaneously "claiming" a printer, it would print text or information generated by both processors at the same time, which is obviously unacceptable.

A "resource" therefore has a stored bit which is called a gate. If the gate is a "0", it means the resource is available and can be used by whichever processor or active device wishes to "claim" it. In FIG. 6, if I/O device A wishes to use resource 124, which is a printer-driver algorithm stored in global memory, I/O device A accesses the resource and reads the "gate" in resource 40. If the gate in resource 124 is a "0", I/O device A can "claim" the resource or printer driver for its exclusive use. It does this by writing a "1" into the gate bit, i.e., sets the gate to a "1". If I/O device B then wants to use the printer while I/O device A is using it, I/O device B will read the gate in printer-driver 124, discover it is a "1", and will have to wait until I/O device A is through with it. At that time, I/O device A resets the gate to a "0".

The above procedure is carried out by using a "test and set" instruction, i.e., "test" the gate to see if the resource is free, and if it is "set" the gate to "lock up" the resource so that no other processor can use it until it is free again.

The basic problem that occurs if two processors or active devices try to read the gate of the resource at approximately the same time, both see that it is available, both write a "1" into its gate, and both think that they have properly "claimed" the resource. To prevent this, the "test and set" instruction needs to be "indivisible". This is normally done by delaying a "demand write back" request from the second processor while the first processor or active device is performing its test and set on the resource gate. This allows the first processor to claim sole ownership of the line containing the gate in its cache during the entire period from reading it, modifying it, to rewriting it in its cache. By delaying the demand write back, processor 2 cannot access the gate until it has been set to a "1" by processor 1.

The SCU (System Control Unit) 3 is basically an I/O controller which transfers data between the primary VME bus 101 and the Global Memory 13, and it also performs bus arbitration and a few other functions. It has an I/O cache 120.

In accordance with one aspect of the I/O cache of the present invention, the SCU 3 is capable of recognizing whenever any of the I/O devices such as 115, 116, or any other active device attempts to read the state of the resource gate of printer driver 124 in the Global Memory 13. The SCU, which is a very fast processor, then takes over the job of performing the test and set instruction on behalf of the requesting I/O device, which is very slow compared to the SCU processor. This avoids the need to delay demand write back operations in accordance with the cache coherency previously described for the very long time that would be required if I/O device A were to perform its own test and set function.

In accordance with the present invention, the manner of implementing this technique is to dedicate an entire four kilobyte page or the I/O bus to contain a copy of the resource gate of printer driver 124. Any access by an I/O device to that page automatically sets the gate if the resource is free. Then, if I/O device A wants the printer driver, it addresses the dedicated page, and the SCU 3 quickly writes a "1" into that location (using input 123 of OR gate 122) unloading the line containing the gate into the I/O cache in order to claim the resource 124 if it is currently free. Simultaneously, the value of the gate bit before modification by the SCU 3 is sent to the I/O device via path 119 to enable it to determine whether the resource 40 is free.

When the gate bit is "0", and the resource 124 is free, and I/O device A reads the gate bit, the SCU 3 will send a gate signal directly to I/O device A from Global Memory 13 via path 119. Therefore, I/O device A will immediately see that the resource is free because the value of the gate bit is "0". SCU 3 also will simultaneously set the gate in I/O cache 120 to a "1". Therefore, SCU 3 has automatically claimed the gate on behalf of I/O device A. This operation is indivisible because it occurs in one memory cycle, since SCU 3 is a high speed processor. Therefore, no other active device can be asking for the gate during this time.

Thus, the I/O cache stores a copy of a gate bit of a resource stored in global memory wherein the I/O controller, which includes a high speed processor, performs an indivisible test and set (which is an indivisible read modify write) operation on the gate to "claim" the resource for the much slower requesting I/O device, and where the test and set operation is activated by access to a special page.

What is claimed is:

1. A method of maintaining cache coherency in a computer system including a plurality of processors each coupled to a bus and each having an associated cache memory, respectively, and a global memory coupled to the bus, the method comprising the steps of:
   (a) storing each of a plurality of blocks of data received via the bus in a plurality of addressable locations in each of the cache memories, and for each block of data, storing first, second and third status bits associated with that block of data at the same address as that block of data, each first status bit having a first level indicating that the first cache memory does not contain that block of data and a second level indicating that its associated block of data is up-to-date, each second status bit having a first level indicating that its associated block of data may be stored in any other cache memory and a second level indicating that no other copy of its associated block of data is stored in another cache memory, each third status bit having a first level indicating that its associated block of data has not been modified while in the addressed location and a second level indicating that its associated block of data has been modified while in that cache memory; and
   (b) operating a first processor to address a first block of data in a first cache memory and causing a cache miss only if (1) the first status bit in the addressed location of the first cache memory has the first level indicating that the first cache memory does not contain the first block of data or (2) the first bit in the addressed location of the first cache memory has the second level indicating that an up-to-date copy of the first block of data is in the first cache memory, and the second status bit in the addressed location of the first cache memory has the first level indicating that another copy of the first block of data may be in another cache memory, and the first processor needs to modify the first block of data.

2. The method of claim 1 including, if there has been a cache miss, operating the first processor to perform an allocate write back of a second block of data in the addressed location of the first cache memory if the first status bit in the addressed location has the first level and the third status bit in the addressed location has the second level.

3. The method of claim 1 including operating the first processor to read to write into the first block of data in the addressed location without accessing the bus if the first status bit has the second level, and the second status bit has the second level.

4. The method of claim 1 including storing blocks of data in the global memory without storing in the global memory any status bits of any kind which are used to maintain cache coherency.

5. In a computer system including a processor, an operand cache including a directory section and a storage section, a translation cache, and a virtual bus coupled to the processor, the improvement comprising in combination:
(a) first means coupled to the virtual bus for converting a virtual address on the virtual bus to a physical address on a physical address bus;
(b) second means coupled to the first means and including a non-associative directory in the directory section for directly mapping, on a one-to-one basis, a first range of physical addresses between a first physical address and a second physical address into a first portion of the storage section; and
(c) third means coupled to the virtual bus and including an associative directory in the directory section for multiply mapping addresses on the virtual bus which are outside of the first range into a second portion of the storage section exclusive of the first portion.

6. The improvement of claim 5 including a translation cache coupled to the virtual bus and the physical bus, and a first comparator comparing a tag accessed from the translation cache and a tag comparison field in the virtual address to produce a translation cache hit signal, the translation cache translating virtual addresses from the virtual bus into physical addresses on the physical bus.

7. The improvement of claim 6 wherein the direct one-to-one mapping means includes a second comparator comparing a physical address accessed from the translation cache to the first range of addresses and producing a direct mapping enable signal if the physical address is in the first range.

8. The improvement of claim 7 wherein the directory section includes an associative directory storing tags which represent physical addresses and means for comparing a plurality of tags accessed from the associative directory with a physical address accessed from the translation cache to produce an associative hit signal indicating which tag in the associative directory matches the physical address.

9. In a computer system including a processor coupled to a bus, an operand cache memory coupled to the bus and comprising in combination:
(a) a translation cache memory coupled to the bus, the bus carrying virtual addresses produced by the processor, the translation cache memory storing tags and physical addresses;
(b) a first comparator coupled to the translation cache memory comparing a tag comparison field of a virtual address with a tag stored in the translation cache memory to produce a translation cache hit signal if there is a match;
(c) a first directory memory coupled to the bus and the translation cache memory and storing coherency status bits for each addressable block of data stored in a first portion of a cache storage section of the operand cache memory;
(d) a second comparator receiving a physical address from the translation cache and producing a first control signal if the physical address is in a preselected range;
(e) a second directory memory coupled to the bus and storing the coherency bits for each addressable block of data and also storing tags for each addressable block of data, respectively, stored in a second portion of the cache memory;
(f) a third comparator receiving a physical address from the translation cache and comparing those physical addresses with tags accessed from the second directory memory and;
(g) means coupled to the cache storage section and the translation cache, the first, second and third comparators and the first directory memory for producing a cache address which accesses an address of a location in the first portion of the cache storage section if the physical address is in the preselected range and which accesses a location in the second portion of the cache storage section if the physical address is outside of the preselected range.

10. A method of operating a computer system that produces virtual addresses to reduce the number of instruction cache misses due to clearing an instruction cache as a result of a context switch, the method comprising the steps of:
(a) storing a plurality of instructions of first and second categories, respectively, in an instruction cache after occurrence of an instruction cache miss, and also storing a first category bit with each instruction of the first category and a second category bit with each instruction of the second category;
(b) operating the processor to execute a first program of instructions of the first category by searching for first category bits in the instruction cache and then sequentially supplying instructions having the first category bits into an instruction fetch pipeline; and
(c) operating the processor to execute a second program of instructions of the first category by:
  i. clearing all of the first category bits, and leaving all of the second category bits unchanged,
  ii. storing a plurality of new instructions of the first category for the second program in the instruction cache, and also storing a first category bit with each of the new instructions.

11. A system for maintaining cache coherency in a computer system, comprising in combination:
(a) a plurality of processors, including a first processor, each coupled to a bus and each having an associated cache memory, respectively;
(b) a global memory coupled to the bus;
(c) means in each cache memory for storing each of a plurality of blocks of data and first, second and third status bits associated with that block of data and received via the bus in a plurality of addressable locations, respectively, of that cache memory, each first status bit having a first level indicating that the first cache memory does not contain that block of data and a second level indicating that a block of data in the location is up-to-date, each second status bit having a first level indicating that the block of data in the location may be stored in any other cache memory and a second level indicating that no other copy of its associated block of data is stored in another cache memory, each third status bit having a first level indicating that its associated block of data has not been modified while in the addressed location and a second level indicating whether that block of data has been modified while in the location; and (d) means for operating the first processor to address a first block of data in a first cache memory and causing a cache miss only if (1) the first status bit in the addressed location of the first cache memory has the first level indicating that the first cache memory does not contain the first block of data or (2) the first bit in the addressed location of the first cache memory has the second level indicating that an up-to-date copy of the first block of data is in the first cache memory, and the second status bit in the addressed location of the first cache memory has the first level indicating that another copy of the first block of data may be in another cache memory, and the first processor needs to modify the first block of data.

12. The system of claim 11 including means for operating the first processor to perform an allocate write back of a second block of data in the addressed location of the first cache memory if there has been a cache miss and if the first status bit in the addressed location has the first level and the third status bit in the addressed location has the second level.

13. The system of claim 11 including means for operating the first processor to read or write into the first block of data in the addressed location without accessing the bus if the first status bit has the second level, and the second status bit has the second level.

14. The system of claim 11 wherein there are no status of any kind stored in the global memory which are used to maintain cache coherency.

15. A method of operating a computer system including a processor, an operand cache including a directory section and a storage section, a translation cache, and a virtual bus coupled to the processor, the method comprising the steps of:

(a) converting a virtual address on the virtual bus to a physical address on a physical address bus;

(b) directly mapping, on a one-to-one basis, by means of a non-associative directory of the directory section, a first range of physical addresses between a first physical address and a second physical address into a first portion of the storage section; and (c) multiply mapping addresses on the virtual bus outside of the first range into a second portion of the storage section exclusive of the first portion by means of an associative directory of the directory section.

16. A method of operating a computer system which produces virtual addresses, the computer system including a processor coupled to a bus and an operand cache memory coupled to the bus, each addressable block of data in the computer system having a plurality of cache coherency status bits associated therewith, the method comprising the steps of:

(a) providing a translation cache memory coupled to the bus, the bus carrying virtual addresses produced by the processor, the translation cache memory storing tags and physical addresses;

(b) comparing a tag comparison field of a virtual address with a tag stored in the translation cache memory to produce a translation cache hit signal if there is a match;

(c) storing the cache coherency status bits for each addressable block of data stored in a first portion of a cache storage section of the operand cache memory in a first directory memory coupled to the bus and the translation cache memory;

(d) comparing a physical address from the translation cache to a preselected range and producing a first control signal if the physical address is in a preselected range;

(e) storing the cache coherency status bits for each addressable block of data in a second directory memory coupled to the bus and also storing tags for each addressable block of data, respectively, stored in a second portion of the cache memory in the second directory memory;

(f) comparing physical addresses from the translation cache with tags accessed from the second directory memory; and (g) producing a cache address which accesses an address of a location in the first portion of the cache storage section if the physical address is in the preselected range and which accesses a location in the second portion of the cache 17. A method of operating a computer system that produces virtual addresses to avoid operand cache misses caused by stack operations, the computer system including a global memory storing a plurality of user programs, a first processor coupled by a bus to the global memory, a first operand cache means associated with the first processor, a second processor coupled by the bus to the global memory, and a second operand cache means associated with the second processor, the method comprising the steps of:

(a) operating the first processor to load a plurality of stack frames for the various user programs, respectively, into a direct-mapped portion of the first operand cache means; and (b) operating the first processor to execute the various user programs and access the stack frames corresponding to the various user programs, respectively, in the first operand cache means without transferring any of the stack frames back and forth between the first operand cache means and the global memory.

18. In a computer that produces virtual addresses, the computer including a global memory storing a plurality of user programs in a global memory coupled to a bus, first and second processors coupled by the bus to the global memory, and first and second operand cache means coupled to the bus and associated with the first and second processors, respectively, the system comprising in combination:

(a) means for operating the first processor to load a plurality of stack frames for the various user programs, respectively, into the first operand cache means, as needed by the first processor to execute the various user programs, respectively; and (b) means for operating the first processor to execute the various user programs and access the stack frames corresponding to those various user programs, respectively, in the first operand cache means without transferring any of the stack frames back and forth between the first operand cache means and the global memory.

* * * * *